(12) United States Patent
Takahashi et al.

(10) Patent No.: US 8,328,973 B2
(45) Date of Patent: Dec. 11, 2012

(54) METHOD OF MANUFACTURING RADIAL TIRE FOR CONSTRUCTION VEHICLE

(75) Inventors: Ken Takahashi, Hiratsuka (JP); Kazuo Teramoto, Hiratsuka (JP); Tsuyoshi Maekawa, Onomichi (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 1080 days.

(21) Appl. No.: 10/573,450

(22) PCT Filed: Oct. 1, 2004

(86) PCT No.: PCT/JP2004/014480
§ 371 (c)(1),
(2), (4) Date: Jan. 19, 2007

(87) PCT Pub. No.: WO2005/032808
PCT Pub. Date: Apr. 14, 2005

(65) Prior Publication Data
US 2007/0199639 A1    Aug. 30, 2007

(30) Foreign Application Priority Data
Oct. 1, 2003  (JP) .................. 2003-343332

(51) Int. Cl.
*B60C 9/08*  (2006.01)
*B29D 30/20*  (2006.01)

(52) U.S. Cl. ........ 156/124; 152/550; 152/557; 156/123; 156/133

(58) Field of Classification Search ........ 156/123, 156/133, 124; 152/550, 555, 557, 561
See application file for complete search history.

(56) References Cited

U.S. PATENT DOCUMENTS

| | | | | | |
|---|---|---|---|---|---|
| 3,442,315 | A | * | 5/1969 | Mirtain | 152/556 |
| 3,703,203 | A | * | 11/1972 | Simpson | 152/554 |
| 4,284,117 | A | * | 8/1981 | Poque et al. | 152/527 |
| 4,469,158 | A | | 9/1984 | Kazuyuki et al. | |
| 5,164,029 | A | * | 11/1992 | Oohashi et al. | 152/546 |
| 5,437,321 | A | * | 8/1995 | Breny | 152/454 |
| 6,478,064 | B1 | * | 11/2002 | Ueyoko | 152/543 |

FOREIGN PATENT DOCUMENTS

| | | |
|---|---|---|
| EP | 0 535 969 A1 | 4/1993 |
| JP | 01-282004 | 11/1989 |

(Continued)

OTHER PUBLICATIONS

Supplementary European Search Report issued May 22, 2007, in corresponding European Application No. 04791947.

*Primary Examiner* — Geoffrey L Knable
(74) *Attorney, Agent, or Firm* — Greer, Burns & Crain, Ltd.

(57) ABSTRACT

Disclosed is a method of manufacturing a radial tire for a construction vehicle, wherein when a cylindrical band is formed by using one layer of carcass layer formed of steel cords in a band making step, a shape retaining layer formed of at least one layer of organic fiber cords is wrapped on the outer peripheral surface of the carcass layer so that the organic fiber cords cross the steel cords of the carcass layer. The radial tire having excellent uniformity without any uneven widening between the steel cords can be provided without using a shape retaining auxiliary apparatus.

15 Claims, 6 Drawing Sheets

FOREIGN PATENT DOCUMENTS

| | | |
|---|---|---|
| JP | 03-157204 | 7/1991 |
| JP | 03-227705 A * | 10/1991 |
| JP | 04-356203 | 12/1992 |
| JP | 5-319015 | 12/1993 |
| JP | 08-058309 | 3/1996 |
| JP | 2000-094904 | 4/2000 |
| WO | WO 80/00069 A | 1/1980 |
| WO | WO 00/01543 A | 1/2000 |

* cited by examiner

METHOD OF MANUFACTURING RADIAL TIRE FOR CONSTRUCTION VEHICLE

TECHNICAL FIELD

The present invention relates to a method of manufacturing a radial tire for an enormously heavy construction vehicle, and more specifically, to a method of manufacturing a radial tire for a construction vehicle which is capable of suppressing deformation attributable to an external force in a making process or to its own weight without using an especially major-scale shape retaining auxiliary apparatus.

BACKGROUND ART

Figure 9:
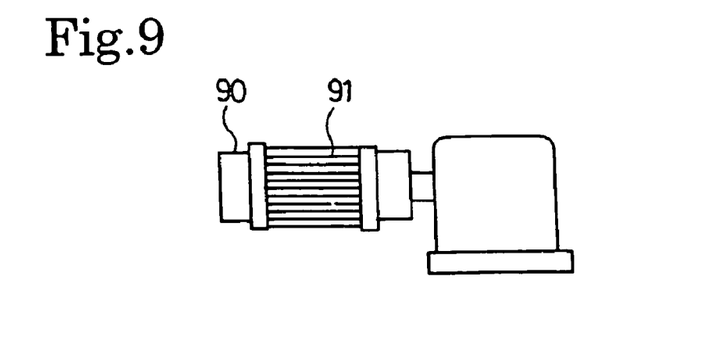
FIG. 9 is an explanatory view showing a band making step in a pneumatic radial tire manufacturing process.
Figure 10:
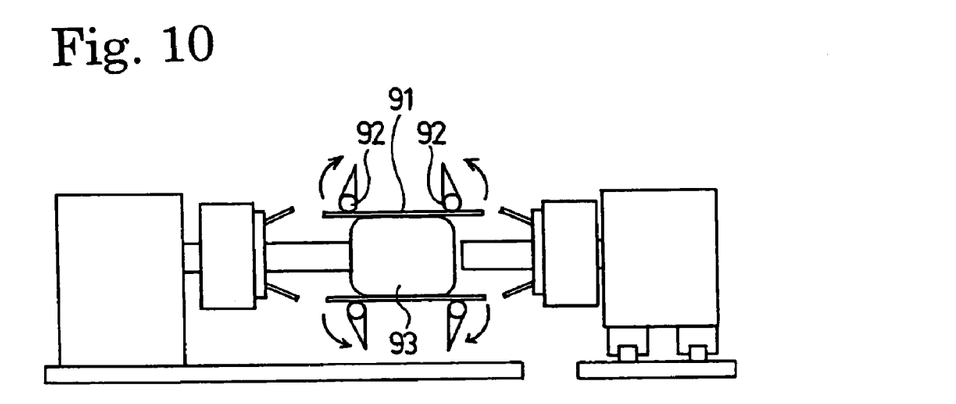
FIG. 10 is an explanatory view showing a first green tire making step in the pneumatic radial tire manufacturing process.
Figure 11:
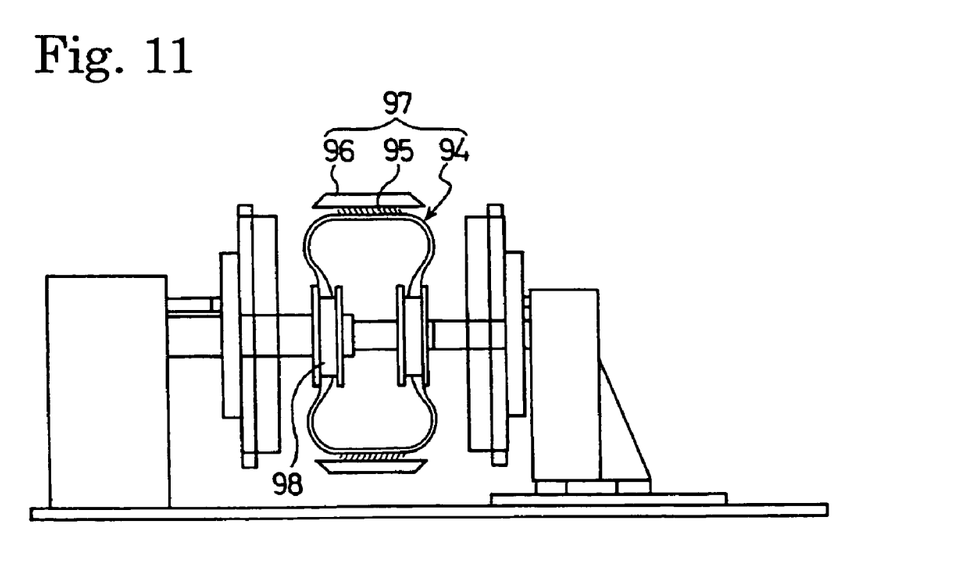
FIG. 11 is an explanatory view showing a second green tire making step in the pneumatic radial tire manufacturing process.

FIGS. 9 to 11 exemplify a typical making process of a pneumatic radial tire. FIG. 9 shows a band making step in which a sheet-shaped carcass layer arranging numerous steel cords in parallel is wrapped on a making drum 90 to form a cylindrical band 91. Subsequently, the cylindrical band 91 is detached from the making drum 90 and moved onto a making drum 93 for a first green tire making step as shown in FIG. 10. On the making drum 93, bead cores 92 and 92 are respectively inserted from outside to both end portions of the cylindrical band 91, and then the both end portions of the cylindrical band 91 are folded back as indicated by arrows so as to wrap these bead cores 92 and 92. A first green tire is made by further wrapping side treads on the outer peripheries of the both end portions thus folded back. Subsequently, the first green tire is detached from the making drum 93 and moved onto bead rings 98 for a second green tire making step as shown in FIG. 11. On the bead rings 98, both end portions in the width direction of the first green tire 94 are pulled toward the center and a central portion is expanded at the same time. The first green tire 94 is shaped into a toroidal green tire 97 by wrapping a belt layer 95 and a cap tread layer 96 on the periphery of the expanded central portion. Lastly, the second green tire 97 is taken off from the bead rings 98 and put into a mold, and is subjected to vulcanization and curing in the state pressed against an inner surface of the mold while expanding a bladder from inside to form a product tire.

In the meantime, a pneumatic tire for a construction vehicle is characterized by an extremely heavy weight in comparison with passenger car tires and normal truck and bus tires. For example, a relatively small tire in the tire size of the 1800R33 class has a weight equal to or above 450 kg, while a tire in the medium tire size of the 2700R49 class exceeds 1400 kg. Since the pneumatic radial tire for a construction vehicle is enormously heavy as described above, the green tire may be deformed in the aforementioned tire making step not only due to an external force from outside but also due to its own weight, and may be formed into a tire having low uniformity when subjected to vulcanization while containing deformation. Conventionally, to prevent such deformation, an especially major-scale shape retaining auxiliary apparatus has been used in the respective making steps for the pneumatic tire for a construction vehicle.

As a result of investigation by the inventors of the present invention, it was found out that a lot of deformation in the making steps for the above-described enormously heavy green tire mainly occurred in junctions on the carcass layer, and that tension applied in the circumferential direction of the tire relative to carcass cords was a major cause thereof. For example, in the band making step, locally uneven widening (open cords) occurs between the carcass cords pivotally around the junctions on the carcass layer when detaching the cylindrical band from the making drum. Meanwhile, the tension in the circumferential direction may occur locally when suspending the cylindrical drum at the time of moving the cylindrical band from the making drum of the band making step to the making drum of the first green tire making step or when expanding the first making drum after inserting the cylindrical band into the first making drum, whereby locally uneven widening or disorder in the arrangement of the cords is apt to occur between the carcass cords.

Moreover, in the second green tire making step, uneven widening is apt to occur between the cords when expanding the first green tire into a toroidal shape. Meanwhile, in the step of setting the second tire into the mold and performing vulcanization, the weight is further increased by assembling the belt layer and the tread rubber. Accordingly, the second green tire is subject to deformation due to its own weight.

As described previously, prevention of deformation in the making steps for the pneumatic radial tire for a construction vehicle is carried out by use of the major-scale shape retaining auxiliary apparatus. However, the major-scale apparatus requires not only excessive plant costs but also a space for installation and more operating procedures, thereby leading to a decline in productivity. Accordingly, contribution to cost reduction will be immense if it is possible to achieve prevention of deformation without using the shape retaining auxiliary apparatus. However, a solution thereto is not yet to be found.

In terms of a heavy-duty radial tire for a normal truck or bus, which is lighter than the tire for a construction vehicle, there is one configured to insert a reinforcing layer made of organic fiber cords between a carcass layer and an inner liner in a tread shoulder region (see Patent Document 1). However, it is impossible to obtain an effect to prevent uneven widening between the cords on the carcass layer merely by applying such a reinforcing layer simply to the pneumatic radial tire for a construction vehicle of the enormously heavy structure.
Patent Document 1: Japanese patent application Kokai publication No. 5-319015

DISCLOSURE OF THE INVENTION

An object of the present invention is to solve the above-described problems of the related art and to provide a method of manufacturing a radial tire for a construction vehicle, which is capable of suppressing deformation caused in a making process without using an especially major-scale shape retaining auxiliary apparatus.

A method of manufacturing a radial tire for a construction vehicle of the present invention for attaining the above-described object is characterized in that, in a method of manufacturing a radial tire for a construction vehicle having the steps of forming a green tire that buries a reinforcing structure constructed by forming one layer of a carcass layer arranging numerous steel cords into a cylindrical band, inserting bead cores respectively from outside to both end portions of the cylindrical band and folding back the both end portions of the cylindrical band, and subjecting the green tire to vulcanization, at least one layer of a shape retaining layer arranging numerous organic fiber cords in parallel is wrapped on an outer peripheral side of the carcass layer such that the organic fiber cords cross the steel cords of the carcass layer when making the aforementioned cylindrical band.

According to the present invention, when making a cylindrical band using a sheet-shaped carcass layer, at least one layer of a shape retaining layer made of organic fiber cords is wrapped such that the organic fiber cords cross steel cords of the carcass layer. In this way, it is possible to improve shear rigidity of the carcass layer in terms of the circumferential direction of a tire by this shape retaining layer. Therefore, it is possible to prevent uneven widening between the steel cords on the carcass layer in respective steps of making a first green tire and a second green tire without using a shape retaining auxiliary apparatus in particular. As a result, it is possible to manufacture a pneumatic radial tire for a construction vehicle having high uniformity at low costs.

BRIEF DESCRIPTION OF THE DRAWINGS

FIGS. 12(*a*) to 12(*d*) are graphs respectively showing inspection results of uneven widening of steel cords in radial tires for a construction vehicle, which are manufactured in accordance with a conventional example and the present invention.

BEST MODES FOR CARRYING OUT THE INVENTION

A method of manufacturing a radial tire for a construction vehicle of the present invention includes a first band making step in a tire making process. Here, at the time of forming a cylindrical band by using a single-layered carcass layer made of unvulcanized rubber while arranging numerous steel cords in parallel, at least one layer of a shape retaining layer arranging numerous organic fiber cords in parallel is further wrapped on an outer peripheral side of the carcass layer constituting the cylindrical band such that the organic fiber cords cross the steel cords of the carcass layer.

The tire making process applied to the present invention may be in accordance with the conventionally typical tire making process as shown in FIGS. 9 to 11, or alternatively, in accordance with a tire making process arranged to carry out a first green tire making step and a second green tire making step in one stage with a single making machine as long as the above-mentioned operation of wrapping the shape retaining layer is included in the first band molding step.

In the present invention, the cylindrical band is made by use of the single-layered carcass layer. The steel cords of the carcass layer are set to a cord angle in a range from 85° to 90° relative to the circumferential direction of the tire (corresponding to the circumferential direction of a making drum) as a tire having a radial structure. While one or more shape retaining layers are provided herein, at least one layer thereof is set to a width in an axial direction of the tire in a range from 60% to 100% relative to space between bead cores disposed on both end portions of the cylindrical band.

When setting the steel cords of the carcass layer to a cord angle approximately equal to 90° relative to the circumferential direction of the tire, at least two shape retaining layers may be disposed such that organic fiber cords in the layers cross each other. Moreover, the at least two shape retaining layers may cover 60% to 100% of the space between the bead cores disposed on the both end portions of the cylindrical band, respectively. Further, the organic fiber cords in the shape retaining layers may be set to a crossing angle in a range from 1° to 12° relative to the steel cords of the carcass layer.

Meanwhile, when setting the steel cords of the carcass layer to a cord angle in a range from 85° to 90° relative to the circumferential direction of the tire, the shape retaining layers may include a first shape retaining layer set to a width in the axial direction of the tire in a range from 60% to 100% of the space between the bead cores disposed on the both end portions of the cylindrical band, and a second shape retaining layer laminated on an outer peripheral side in a central region of the first shape retaining layer and set to a smaller width than that of the first shape retaining layer. Moreover, the crossing angle defined between the organic fiber cords of the second shape retaining layer and the steel cords of the carcass layer may be set greater than the crossing angle defined between the organic fiber cords of the first shape retaining layer and the steel cords of the carcass layer.

Meanwhile, the width in the axial direction of the tire of the second shape retaining layer having the smaller width may be set in a range from 15% to 45% of the space between the bead cores on the both end portions.

In addition, in the above-described configuration, the crossing angle defined between the organic fiber cords of the first shape retaining layer and the steel cords of the carcass layer may be set in a range from 1° to 12°, while the crossing angle defined between the organic fiber cords of the second shape retaining layer and the steel cords of the carcass layer may be set in a range from 30° to 70°.

Now, reference will be made to examples shown in the drawings, and the examples will be concretely described below.

Figure 1:
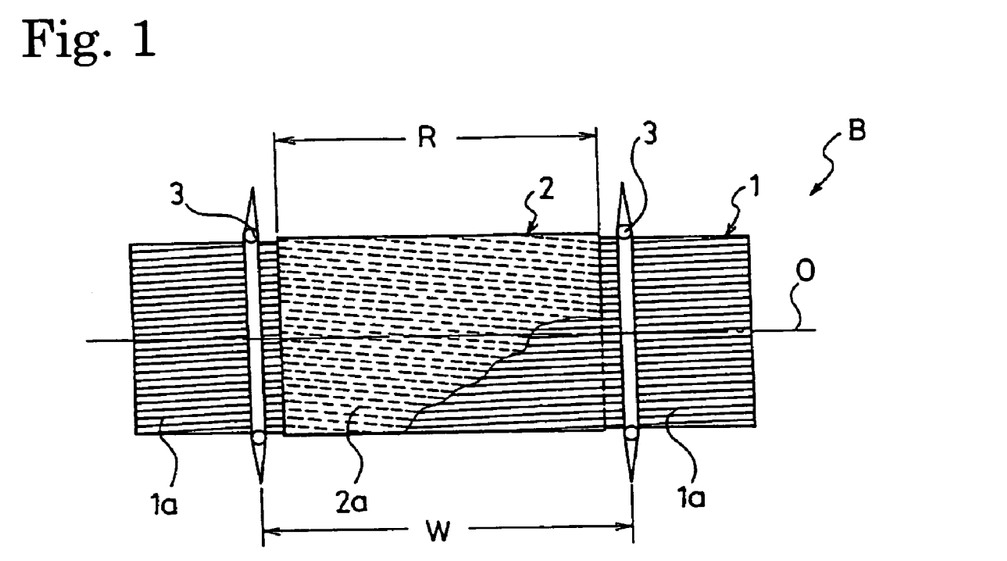
FIG. 1 is a schematic diagram showing an example of a first green tire making step in a method of manufacturing a radial tire for a construction vehicle of the present invention.

FIG. 1 shows an example of the present invention in the state where a cylindrical band B made by the band making step as a precedent step is fitted to a making drum for a first green tire making step.

The cylindrical band B is made by the band making step as the precedent step and is then moved onto the making drum (not shown) for the first green tire making step. This cylindrical band B includes one sheet of a carcass layer 1 wound into a cylindrical shape around a rotation axis 0 of the making drum, and one sheet of a shape retaining layer 2 wound on the outer peripheral side thereof. The carcass layer 1 is formed by arranging numerous steel cords 1*a* covered with rubber in parallel, and the steel cords 1*a* form an angle of 85° to 90° relative to the circumferential direction of the tire (the orthogonal direction to the rotation axis O).

In the meantime, the shape retaining layer 2 is formed by arranging numerous organic fiber cords 2*a* covered with rubber in parallel. The organic fiber cords 2*a* of this shape retaining layer 2 has a mutually intersecting relation with the steel cords 1*a* of the carcass layer 1, and those cords are inclined mutually to the opposite sides while sandwiching the rotation axis of the drum. Although the type of the organic fiber cords 2*a* constituting the shape retaining layer 2 is not particularly limited, nylon codes, polyester codes, and the like are preferably used herein.

Relative to the cylindrical band B fitted onto the making drum as described above, a pair of bead cores 3 and 3 are respectively inserted from outside to both end portions in the axial direction so as to sandwich the shape retaining layer 2. Subsequently, both end portions of the carcass layer 1 extending outward on both sides are folded back so as to wrap the bead cores 3. Further, sidewall rubber (not shown) are wound so as to cover the both end portions of the carcass layer 1 thus folded back, whereby a first green tire is made. Thereafter, the process goes to a second green tire making step to make the second green tire as similar to making the conventional tire. Lastly, a product tire can be manufactured by inserting the second green tire to a mold to perform vulcanization.

Figure 2:
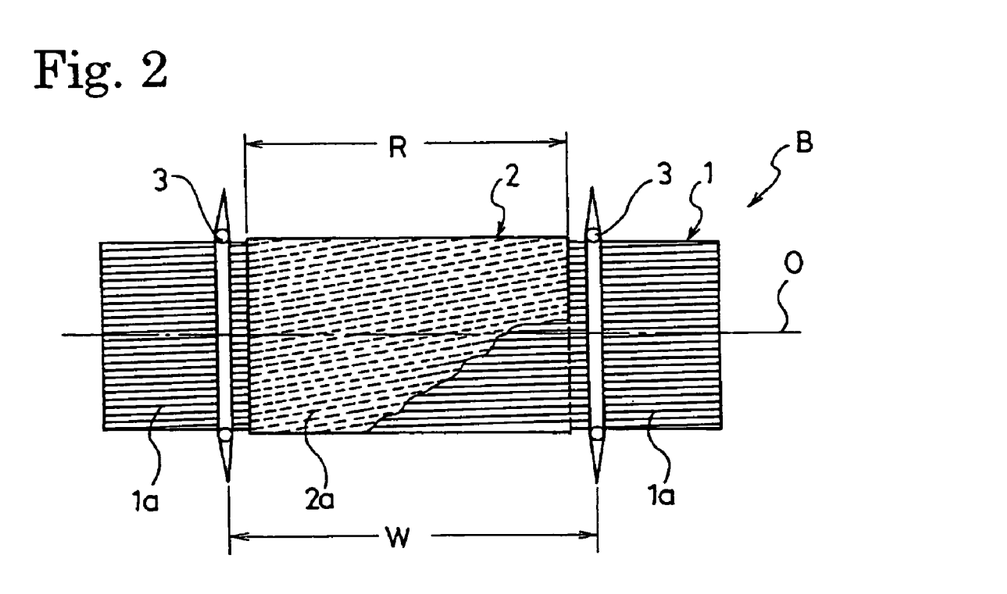
FIG. 2 is a schematic diagram showing another example of the first green tire making step in the method of manufacturing the radial tire for a construction vehicle of the present invention.

FIG. 2 shows another example of the present invention similarly in the state where the cylindrical band B made by the band making step as the precedent step is fitted to the making drum for the first green tire making step.

In this example, configurations to set the steel cords 1*a* of the carcass layer 1 to an angle of 85° to 90° relative to the circumferential direction of the tire and to establish the relation of causing the organic fiber cords 2*a* of the shape retaining layer 2 to intersect the steel cords 1*a* of the carcass layer 1 are similar to the example shown in FIG. 1. However, this example is different from the case of FIG. 1 in that the organic fiber cords 2*a* of the shape retaining layer 2 are inclined to the same side as the steel cords 1*a* of the carcass layer 1 relative to the rotation axis O.

In the respective examples shown in FIGS. 1 and 2, the organic fiber cords 2*a* of the shape retaining layer 2 are disposed so as to cross the steel cords 1*a* of the carcass layer 1 in any case. Accordingly, it is possible to enhance shear rigidity of the carcass layer 1 in terms of the circumferential direction of the tire, and to regulate movement of the steel cords 1*a* in the circumferential direction of the tire by the improvement in shear rigidity. Therefore, it is possible to prevent the carcass layer 1 from causing uneven widening between cords in terms of the steel cords 1*a* without using a shape retaining auxiliary apparatus in the process after the band making step, namely, the first green tire making step, the second green tire making step, the vulcanizing step, and the like.

It is important to dispose the shape retaining layer 2 on the outer peripheral side of the carcass layer 1. If the shape retaining layer 2 is disposed inside the carcass layer 1, the organic fiber cords 2*a* of the shape retaining layer 2 are apt to be fractured at a shoulder portion of the tire after vulcanization. When the fracture occurs in the organic fiber cords 2*a* as described above, an inner liner corresponding to the fractured portion is destroyed and the carcass layer 1 will be eventually destroyed by intrusion of high-pressure air in the tire from the destroyed portion into the carcass layer 1.

The crossing angle between the steel cords 1*a* and the organic fiber cords 2*a* is set preferably in the range from 1° to 12°. If the crossing angle is below 1°, it is disadvantageous not only because an effect to prevent uneven widening of the steel cords 1*a* can not be obtained but also because the organic fiber cords 2*a* may enter the steel cords 1*a* in the tire after vulcanization and the organic fiber cords 2*a* may be fractured by a direct contact of the both kinds of cords while a vehicle is moving. On the contrary, if the angle exceeds 12°, the shear rigidity in the circumferential direction of the tire of the carcass layer 1 becomes too high. Although this aspect is advantageous in light of prevention of uneven widening, the arrangement of the steel cords 1*a* may become uneven in the vulcanizing step, and such unevenness may lead to a failure in a carcass cord wave.

Meanwhile, regarding a width R of the shape retaining layer 2 in terms of the axial direction of the tire (the direction of the rotation axis of the making drum), it is preferable to set the width R in the range from 60% to 100% relative to a space W between the bead cores 3 and 3 on the both end portions, and to dispose the shape retaining layer 2 in a central region of the carcass layer 1 in terms of the axial direction of the tire (a central region in the axial direction of the making drum). Uneven widening of the steel cords 1*a* has the most significant impact on the quality of the tire when it occurs in a region from a crown portion to a shoulder portion of treads. Accordingly, to avoid occurrence of uneven widening of the steel cords in this region, it is desirable to set the width R of the shape retaining layer 2 equal to or above 60% relative to the space between the bead cores 3 and 3 on the both end portions. Meanwhile, if the organic fiber cords 2*a* are interposed between the carcass layer 1, which is folded back so as to wrap over the bead cores 3 and 3, and the bead cores 3 and 3, power for retaining the carcass layer 1 by the bead cores 3 and 3 is reduced and a bead portion is apt to cause a failure. Accordingly, the width R is set preferably equal to or below 100% relative to the space between the bead cores 3 and 3.

Figure 3:
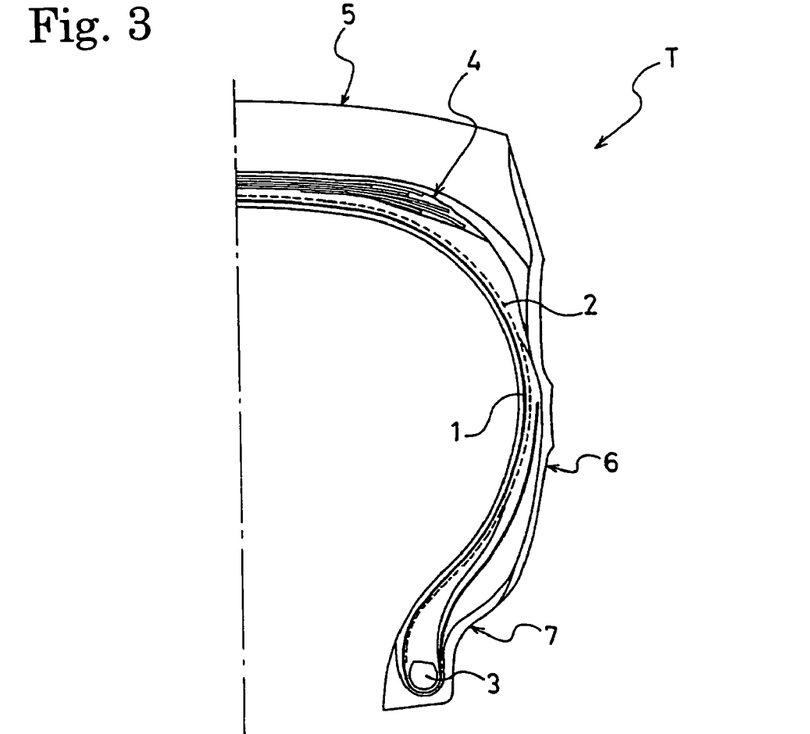
FIG. 3 is a half cross-sectional view showing an example of the radial tire for a construction vehicle manufactured by the respective steps shown in FIGS. 1 and 2.

A radial tire for a construction vehicle formed by vulcanization after undergoing the steps of FIGS. 1 and 2 has a cross-sectional structure as shown in FIG. 3.

In a radial tire T for a construction vehicle shown in FIG. 3, the carcass layer 1 including the steel cords is formed of one layer, and the both end portions extending on right and left bead portions 7 and 7 are folded back from the inside of the tire to the outside respectively around the right and left pair of bead cores 3 and 3. One layer of the shape retaining layer 2 including the organic fiber cords is disposed on the outer peripheral side of the carcass layer 1. Meanwhile, a plurality of belt layers 4 are disposed at a crown portion of the carcass layer 1. Reference numeral 5 denotes the crown portion, reference numeral 6 denotes a sidewall portion, and reference numeral 7 denotes the bead portion.

Figure 4:
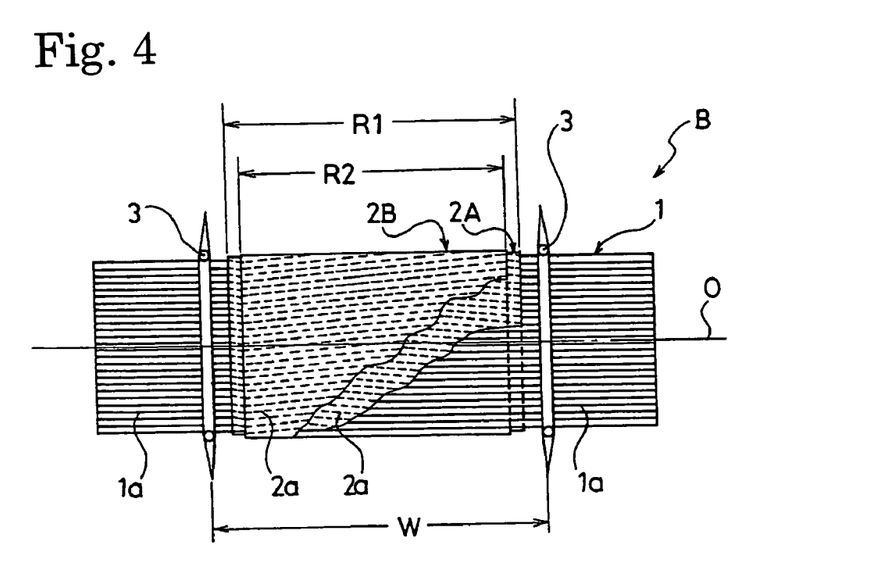
FIG. 4 is a schematic diagram showing still another example of the first green tire making step in the method of manufacturing the radial tire for a construction vehicle of the present invention.

FIG. 4 shows still another example of the present invention similarly in the state where the cylindrical band B made by the band making step as the precedent step is fitted to the making drum for the first green tire making step.

In FIG. 4, the cylindrical band B on the making drum is made by the band making step as the precedent step as similar to the above-described examples. In this cylindrical band B, two shape retaining layers 2A and 2B are wound on the outer peripheral side of the single carcass layer 1. The number of the shape retaining layers may be three or more layers in this case.

The steel cords 1*a* of the carcass layer 1 are set to an angle approximately equal to 90° relative to the circumferential direction of the tire (the orthogonal direction to the rotation axis O). The organic fiber cords 2*a* and 2*a* of the two shape retaining layers 2A and 2B have a mutually intersecting relation with each other and a mutually intersecting relation with the steel cords 1*a* of the carcass layer 1 as well. As similar to the above-described examples, the organic fiber cords 2a constituting the shape retaining layers 2A and 2B are not particularly limited. However, nylon codes, polyester codes, and the like are preferably used herein.

At least the two layers of the shape retaining layers 2A and 2B are disposed on the outer peripheral side of the carcass layer 1. Moreover, the organic fiber cords 2a of the shape retaining layers 2A and 2B are allowed to cross each other and to cross the steel cords 1a of the carcass layer 1 as well. Accordingly, it is possible to enhance shear rigidity of the carcass layer 1 in terms of the circumferential direction of the tire, and thereby to prevent uneven widening between cords in terms of the steel cords 1a without using a shape retaining auxiliary apparatus in the process after the band making step.

The crossing angle between the steel cords 1a of the carcass layer 1 and the organic fiber cords 2a constituting the shape retaining layers 2A and 2B is set preferably in the range from 1° to 12°. If the crossing angle is below 120, it is impossible to obtain an effect to improve the rigidity of the carcass layer 1 in terms of the circumferential direction of the tire. On the contrary, if the angle is greater than 12°, the arrangement of the steel cords 1a may become uneven in the expanding step, and such unevenness is apt to cause a carcass cord wave.

Meanwhile, regarding widths R1 and R2 of the at least two shape retaining layers 2 respectively in terms of the axial direction of the tire (the direction of the rotation axis of the making drum), it is preferable to set the widths R1 and R2 in the range from 60% to 100% relative to the space W between the right and left pair of bead cores 3 and 3, and to dispose the shape retaining layers 2A and 2B in the central region of the carcass layer 1 in terms of the axial direction of the tire. It is more preferable to set the width R1 of the shape retaining layer 2A on the inner layer side grater than the width R2 of the shape retaining layer 2B on the outer layer side (R1>R2). If the widths R1 and R2 of the shape retaining layers 2A and 2B are below 60%, it is difficult to suppress uneven widening of the steel cords 1a in the region from the crown portion to the shoulder portion of the treads. Meanwhile, if the widths R1 and R2 are set greater than 100%, the power for retaining the carcass layer 1 by the bead cores 3 and 3 is reduced, and reduction in the power leads to a failure of the bead portion.

Figure 5:
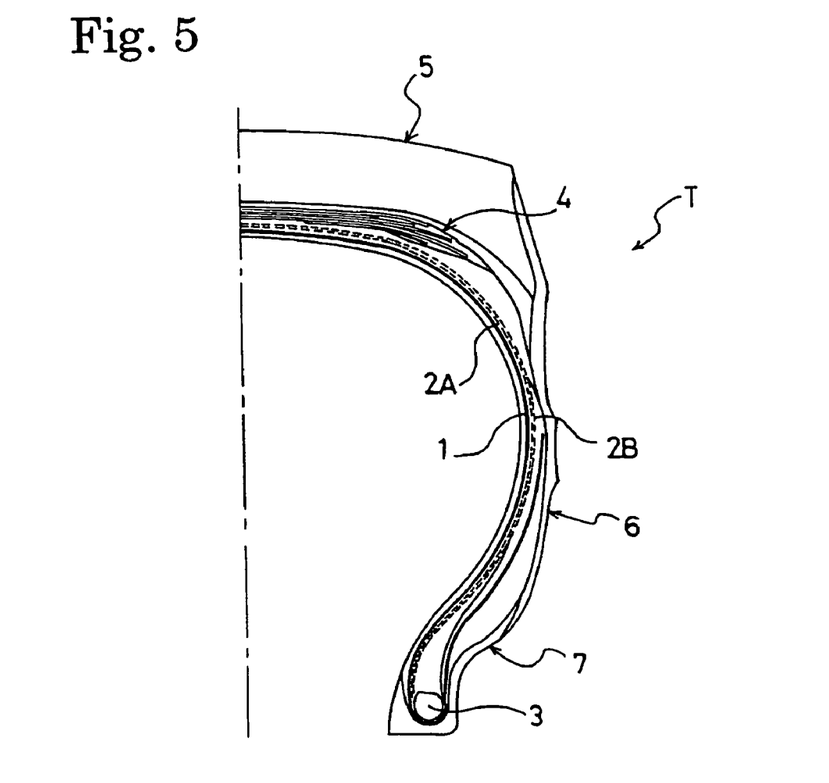
FIG. 5 is a half cross-sectional view showing an example of the radial tire for a construction vehicle manufactured by the step shown in FIG. 4.

A radial tire for a construction vehicle after vulcanization obtained by this example has a cross-sectional structure as shown in FIG. 5. The structure is substantially similar to the tire of FIG. 3 except that the two shape retaining layers 2A and 2B are provided therein.

Figure 6:
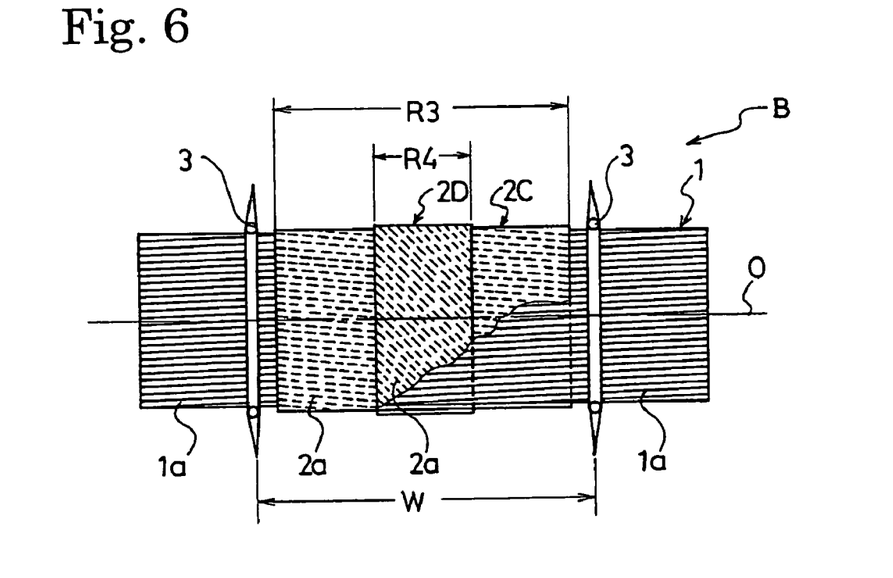
FIG. 6 is a schematic diagram showing still another example of the first green tire making step in the method of manufacturing the radial tire for a construction vehicle of the present invention.

FIG. 6 shows still another example of the present invention similarly in the state where the cylindrical band B made by the band making step as the precedent step is fitted to the making drum for the first green tire making step.

As similar to the above-described embodiment, FIG. 6 shows the state where the cylindrical band B made by the band making step is moved onto the making drum for the first green tire making step. Shape retaining layers wound on the outer peripheral side of the single carcass layer 1 include a first shape retaining layer 2C and a second shape retaining layer 2D which is located further on the outside and set to a smaller width than that of the first shape retaining layer 2C. The carcass layer 1 is disposed such that the steel cords 1a form an angle in the range of 85° to 90° relative to the circumferential direction of the tire.

In terms of the first shape retaining layer 2C, the width in the axial direction of the tire is set in the range from 60% to 100% relative to the space W between the right and left pair of bead cores 3 and 3, and the organic fiber cords 2a thereof are inclined in the opposite direction to the steel cords 1a of the carcass layer 1 while sandwiching the axial direction of the rotation shaft O. Meanwhile, the second shape retaining layer 2D has a width R4 in the axial direction of the tire which is approximately equal to the tire's crown portion. Moreover, the organic fiber cords 2a thereof are inclined in the same direction as the organic fiber cords 2a of the first shape retaining layer 2C, and cross the steel cords 1a of the carcass layer 1 by a larger angle.

Figure 7:
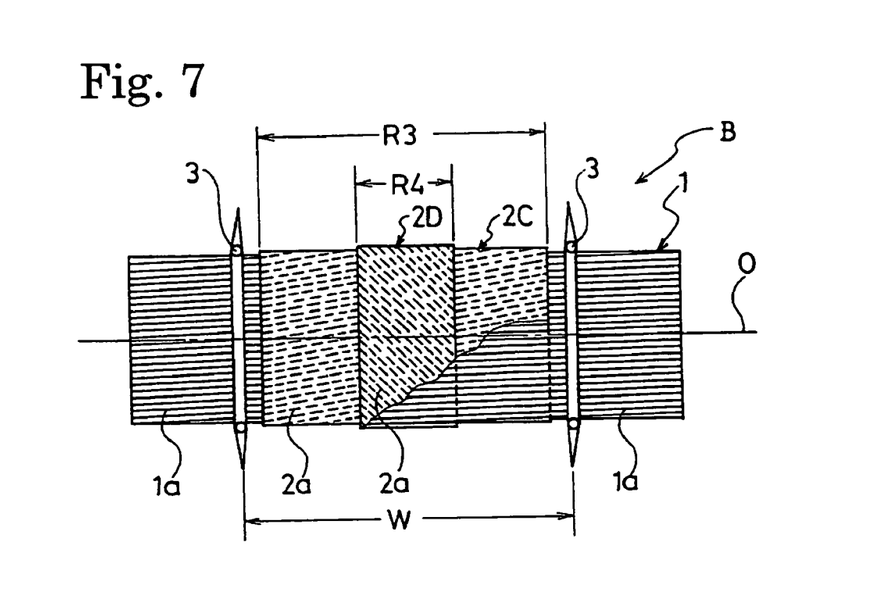
FIG. 7 is a schematic diagram showing yet another example of the first green tire making step in the method of manufacturing the radial tire for a construction vehicle of the present invention.

FIG. 7 shows yet another example of the present invention similarly in the state where the cylindrical band B made by the band making step as the precedent step is fitted to the making drum for the first green tire making step.

This example shown in FIG. 7 only has a difference in that the direction of inclination of the first shape retaining layer 2C relative to the rotation axis O is changed from FIG. 6 so as to cause inclination in the same direction as the steel cords 1a of the carcass layer 1. Other features of the configuration are similar to FIG. 6.

As shown in FIGS. 6 and 7, by laminating the first shape retaining layer 2C having the large width and the second shape retaining layer 2D having the small width, both being made of the organic fiber cords 2a, on the outer peripheral side of the carcass layer 1 including carcass cords 1a set to an angle in a range from 80° to 90° relative to the circumferential direction of the tire so as to cross these carcass cords 1a, shear rigidity at the tire's crown portion and the sidewall portion in terms of the circumferential direction of the tire is improved while maintaining a balance. Accordingly, it is possible to prevent uneven widening of the carcass cords 1a. Particularly, the two layers of the first shape retaining layer 2C and the second shape retaining layer 2D are disposed at the tire's crown portion, whereby the crossing angle of the organic fiber cords 2a of the second shape retaining layer 2D relative to the carcass cords 1a is set greater than the crossing angle defined by the organic fiber cords 2a of the first shape retaining layer 2C. Hence, it is possible to prevent uneven widening of the carcass cords 1a at the tire's crown portion more effectively. Therefore, it is possible to prevent the carcass layer 1 from causing uneven widening between cords in terms of the steel cords 1a without using a special shape retaining auxiliary apparatus particularly in the process after the band making step.

In the foregoing structure, if a width R3 of the first shape retaining layer 2C is below 60% of the space W between the right and left pair of bead cores 3 and 3, it is difficult to suppress uneven widening of the steel cords 1a in the region from the tire's crown portion to the shoulder portion. When the width exceeds 100%, the performance of the bead cores 3 and 3 for retaining the carcass layer 1 is reduced, and such reduction leads to a failure of the bead portion.

Moreover, the width R4 of the second shape retaining layer 2D is set preferably in a range from 15% to 45% relative to the space W between the right and left pair of bead cores 3 and 3, or more preferably to a larger width than a width of an unillustrated innermost belt layer to be disposed adjacently thereto. If the width R4 is below 15% of the space between the right and left bead cores 3 and 3, it is hard to prevent uneven widening of the steel cords 1a at the tire's crown portion. If the width exceeds 45%, a failure of a carcass cord wave is apt to occur in a region from the tire's shoulder portion to the sidewall portion.

It is preferable to set the crossing angle between the steel cords 1a and the organic fiber cords 2a of the first shape retaining layer 2C in the range from 1° to 12°. If the crossing angle is below 1°, it is impossible to obtain the effect to improve the rigidity of the carcass layer in terms of the circumferential direction of the tire as similar to the above-described embodiment. On the contrary, if the crossing angle is greater than 12°, the arrangement of the steel cords 1a may become uneven in the expanding step, and such unevenness leads to occurrence of a carcass cord wave.

Meanwhile, it is preferable to set the crossing angle between the steel cords 1a and the organic fiber cords 2a of the second shape retaining layer 2D in the range from 30° to 70°. If the crossing angle is below 30°, it is hard to prevent uneven widening of the steel cords 1a at the tire's crown portion. On the contrary, if the crossing angle is greater than 70°, a carcass cord wave is apt to occur at the tire's shoulder portion.

Figure 8:
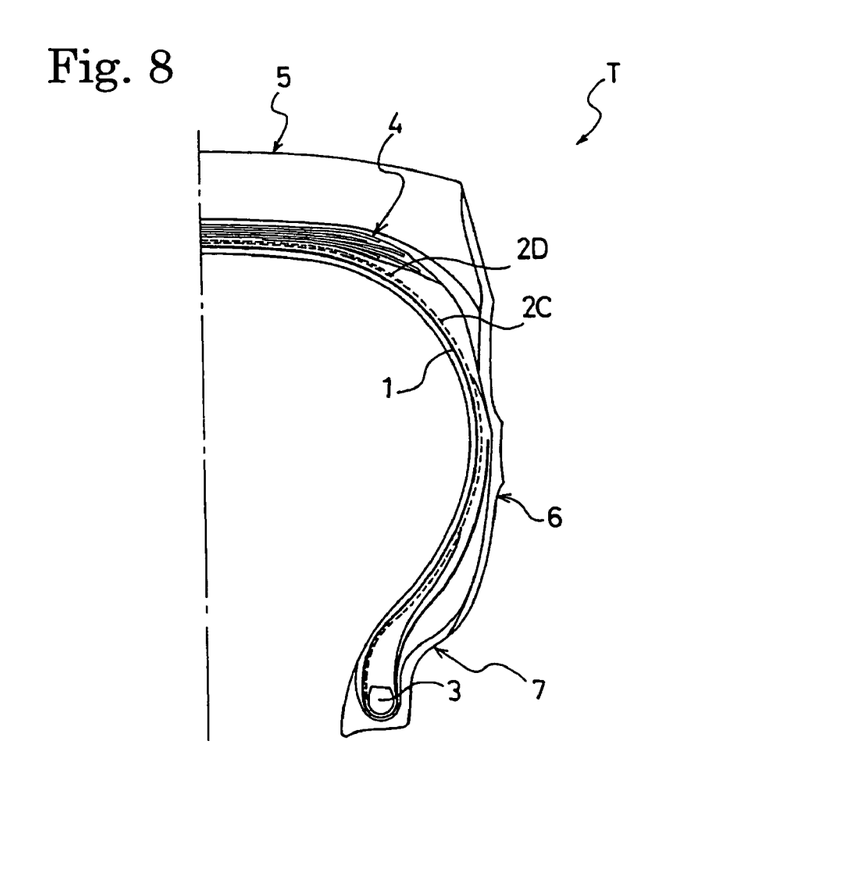
FIG. 8 is a half cross-sectional view showing an example of the radial tire for a construction vehicle manufactured by the respective steps shown in FIGS. 6 and 7.

FIG. 8 shows a cross-sectional structure of a radial tire T for a construction vehicle manufactured in accordance with the above-described examples of FIGS. 6 and 7, which is a similar structure to other examples except for the shape retaining layers.

EXAMPLES

Upon manufacturing of a radial tire for a construction vehicle in a tire size of 2400R35, a conventional tire (Conventional Example) was manufactured without winding any shape retaining layer made of organic fiber cords in the making step of a cylindrical band, and tires applying the present invention (Examples 1 to 3) were respectively manufactured by winding shape retaining layers of 6 nylon cords (2100T/2) while changing cord angles as shown in Table 1.

In terms of the four types of tires, conditions of uneven widening between steel cords at splice portions of respective carcass layers were investigated and evaluated by use of an X-ray inspection machine. In the evaluation process, a cord pitch at the splice portion was defined as Δ and a cord pitch at a normal portion other than the splice portion was defined as δ. Then, as a proportion of the former factor Δ relative to the latter factor δ, Δ/δ was defined as an index d and was evaluated. Conditions of distribution were investigated on graphs while applying the index d to the lateral axis and the number n to the longitudinal axis. Results are shown in FIGS. 12(a) to 12(d).

From FIGS. 12(a) to 12(d), it is apparent that the index d of uneven widening has a peak value of 1.3 in terms of the conventional tire (Conventional Example) and contains a portion equal to or in excess of 1.6, and that uneven widening is locally increased. On the contrary, it is apparent that the index d of uneven widening has a peak value equal to or below 1.2 in Examples 1 to 3, and do not contain a portion equal to or in excess of 1.6. If the index d of uneven widening becomes equal to or above 1.6, there is a trouble in the performance of a tire as a pressure container. Accordingly, it is usually necessary to restrict shipment to the market.

TABLE 1

Figure 12:
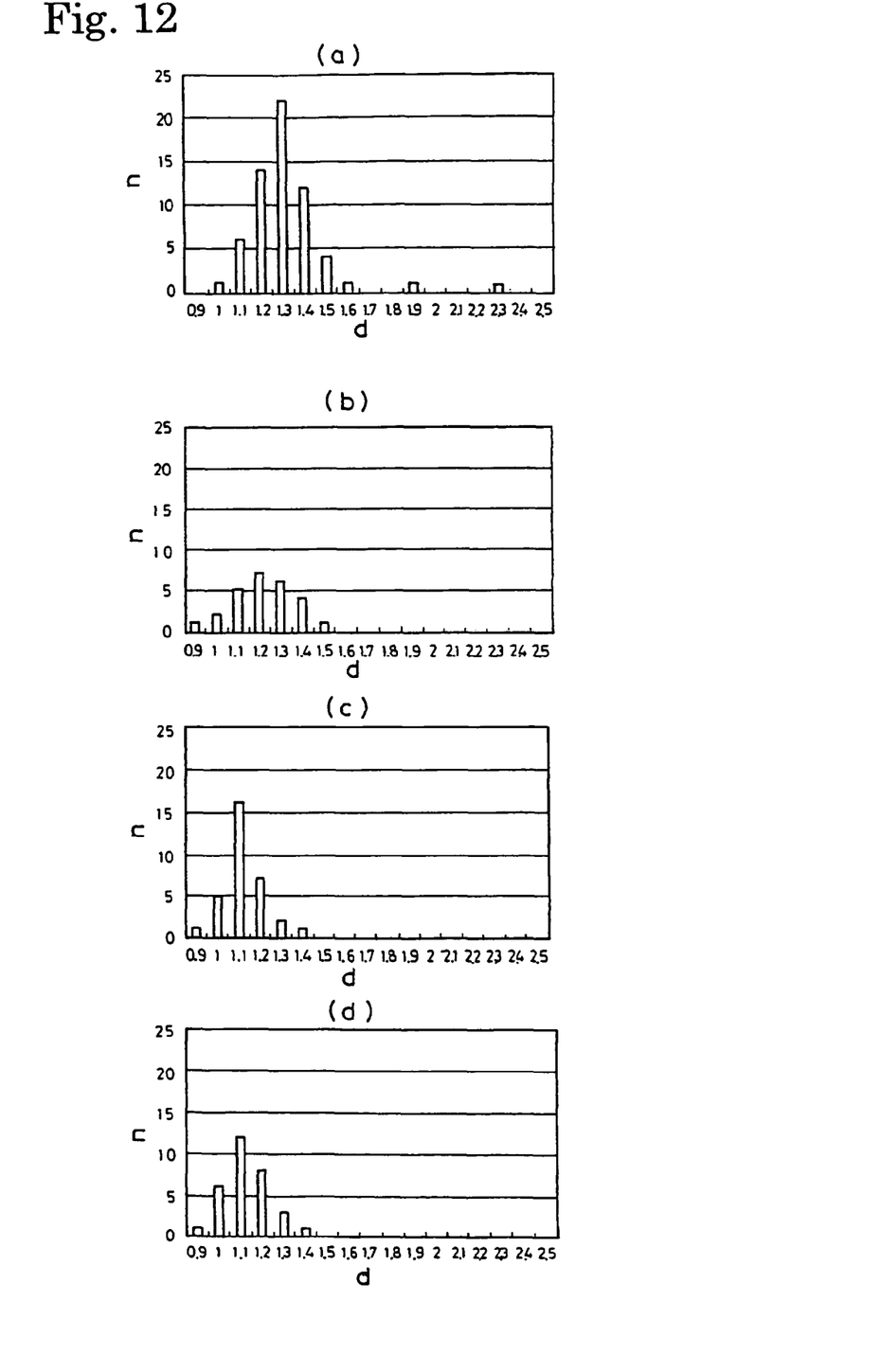

|  |  | Conventional Example | Example 1 | Example 2 | Example 3 |
|---|---|---|---|---|---|
| Embodiment in the method of the present Invention |  | — | First Embodiment (FIG. 1) | Third Embodiment (FIG. 4) | Fourth Embodiment (FIG. 6) |
| Cylindrical band | Shape retaining layer (codes on top indicate reference numerals attached to shape retaining layers in relevant drawings) | — | 2 (R/W = 0.90) | 2A (R1/W = 0.90) 2B (R2/W = 0.80) | 2C (R3/W = 0.90) 2D (R4/W = 0.30) |
|  | Angle of steel cords | 90° | 87° (right side up) | 90° | 87° (right side up) |
|  | Angle of organic fiber cords | — | 2: 87° (right side down) | 2A: 87° (right side down) 2B: 87° (right side up) | 2C: 87° (right side down) 2D: 45° (right side down) |
| Tire after vulcanization | Angle of steel cords |  | 84.5° (right side up) | 90° | Crown portion: 84.5° (right side up) |
|  | Angle of organic fiber cords | — | 2: 84.8° (right side down) | 2A: 84.8° (right side down) 2B: 84.8° (right side up) | 2A: 84.8° (right side down) 2B: 32.0° (right side down) |
| Condition of uneven widening between steel cords | Total number of splices n | 62 | 25 | 31 | 30 |
|  | Distribution of frequency of uneven widening | FIG. 12(a) | FIG. 12(b) | FIG. 12(c) | FIG. 12(d) |

What is claimed is:

1. A method of manufacturing a radial fire for a construction vehicle, comprising:

a band making step of making one layer of a carcass layer that arranges numerous steel cords in parallel into a cylindrical band, a wrapping step of wrapping a shape retaining layer consisting of a first shape retaining layer and a second shape retaining layer directly on an outer peripheral side of the carcass layer that constitutes the cylindrical band, such that the entirety of the first shape retaining layer is in direct contact with the carcass layer and the second shape retaining layer is laminated on an outer peripheral side in a central region of the first shape retaining layer, and inserting a pair of bead cores on the outer peripheral side of the carcass layer such that one of said bead cores is spaced, in a widthwise direction, axially outside of each widthwise end portion of the shape retaining layer, wherein said shape retaining layer includes numerous organic fiber cords arranged in parallel such that the organic fiber cords cross the steel cords of the carcass layer when making the cylindrical band, and wherein the organic fiber cords of the two shape retaining layers have a mutually intersecting relationship with each other, and a mutually intersecting relationship with the steel cords of the carcass layer.

2. The method of manufacturing a radial tire for a construction vehicle according to claim 1, wherein a cord angle of the steel cords of the carcass layer to the circumferential direction of the tire is set in a range from 85° to 90°, and wherein a width in the axial direction of the tire of at least one layer of the shape retaining layers is set in a range from 60% to less than 100% of a space between said bead cores disposed on both end portions of the cylindrical band.

3. The method of manufacturing a radial tire for a construction vehicle according to claim 2,
wherein the cord angle of the steel cords of the carcass layer to the circumferential direction of the tire is set substantially equal to 90°, and
wherein the two layers of shape retaining layers in which the organic fibers thereof to cross each other between the two layers are provided.

4. The method of manufacturing a radial tire for a construction vehicle according to any one of claims 1 to 3, wherein a crossing angle of the organic fiber cords relative to the steel cords is set in a range from 1° to 12 °.

5. The method of manufacturing a radial tire for a construction vehicle according to claim 2,
wherein the first shape retaining layer is set to a width in the axial direction of the tire in a range from 60% to less than 100% of the space between the bead cores disposed on the both end portions of the cylindrical band, and the second shape retaining layer is laminated on an outer peripheral side in a central region of the first shape retaining layer and set to a smaller width than that of the first shape retaining layer, and
wherein a crossing angle defined between the organic fiber cords of the second shape retaining layer and the steel cords of the carcass layer is set greater than a crossing angle defined between the organic fiber cords of the first shape retaining layer and the steel cords of the carcass layer.

6. The method of manufacturing a radial tire for a construction vehicle according to claim 5, wherein the width in the axial direction of the tire of the second shape retaining layer is set in a range from 15% to 45% of the space between the bead cores.

7. The method of manufacturing a radial tire for a construction vehicle according to any one of claims 5 and 6,
wherein a crossing angle of the organic fiber cords of the first shape retaining layer relative to the steel cords of the carcass layer is set in a range from 1° to 12°, and
wherein a crossing angle of the organic fiber cords of the second shape retaining layer relative to the steel cords of the carcass layer is set in a range from 30° to 70 °.

8. The method of manufacturing a radial tire for a construction vehicle according to claim 1, wherein said shape retaining layer avoids uneven widening of said steel cords of said carcass layer without the use of a shape retaining auxiliary apparatus in manufacturing steps subsequent to said band making step and said wrapping step.

9. A method of manufacturing a radial fire for a construction vehicle, comprising:
a band making step of making one layer of a carcass layer that arranges numerous steel cords in parallel into a cylindrical band,
a wrapping step of wrapping a shape retaining layer consisting of a first shape retaining layer and a second shape retaining layer directly on an outer peripheral side of the carcass layer that constitutes the cylindrical band, such that the entirety of the first shape retaining layer is in direct contact with the carcass layer and the second shape retaining layer is laminated on an outer peripheral side in a central region of the first shape retaining layer,
an inserting step of inserting a pair of bead cores on the outer peripheral side of the carcass layer such that one of said bead cores is spaced, in a widthwise direction, axially outside of each widthwise end portion of the shape retaining layer,
a shaping step of shaping the cylindrical band into a toroidal green tire that includes pulling both end portions of the carcass layer towards a central portion, expanding the central portion radially outward, and wrapping a belt layer and a cap tread layer on the central portion, and
a curing step of vulcanizing the toroidal green tire,
wherein said shape retaining layer includes numerous organic fiber cords arranged in parallel such that the organic fiber cords cross the steel cords of the carcass layer when making the cylindrical band,
wherein said shape retaining layer avoids uneven widening of said steel cords of said carcass layer without the use of a shape retaining auxiliary apparatus during said inserting step, said shaping step and said curing step, and
wherein the organic fiber cords of the two shape retaining layers have a mutually intersecting relationship with each other, and a mutually intersecting relationship with the steel cords of the carcass layer.

10. The method of manufacturing a radial tire for a construction vehicle according to claim 9,
wherein a cord angle of the steel cords of the carcass layer to the circumferential direction of the tire is set in a range from 85° to 90°, and
wherein a width in the axial direction of the tire of at least one layer of the shape retaining layers is set in a range from 60% to less than 100% of a space between said bead cores disposed on both end portions of the cylindrical band.

11. The method of manufacturing a radial tire for a construction vehicle according to claim 10,
wherein the cord angle of the steel cords of the carcass layer to the circumferential direction of the tire is set substantially equal to 90°, and
wherein the two layers of shape retaining layers in which the organic fibers thereof to cross each other between the two layers are provided.

12. The method of manufacturing a radial tire for a construction vehicle according to any one of claims 9-11, wherein a crossing angle of the organic fiber cords relative to the steel cords is set in a range from 1° to 12 °.

13. The method of manufacturing a radial tire for a construction vehicle according to claim 10,
wherein the first shape retaining layer is set to a width in the axial direction of the tire in a range from 60% to less than 100% of the space between the bead cores is disposed on the both end portions of the cylindrical band, and the second shape retaining layer laminated on an outer peripheral side in a central region of the first shape retaining layer and set to a smaller width than that of the first shape retaining layer, and
wherein a crossing angle defined between the organic fiber cords of the second shape retaining layer and the steel cords of the carcass layer is set greater than a crossing angle defined between the organic fiber cords of the first shape retaining layer and the steel cords of the carcass layer.

14. The method of manufacturing a radial tire for a construction vehicle according to claim 13, wherein the width in the axial direction of the tire of the second shape retaining layer is set in a range from 15% to 45% of the space between the bead cores.

15. The method of manufacturing a radial tire for a construction vehicle according to any one of claims 13 and 14,
wherein a crossing angle of the organic fiber cords of the first shape retaining layer relative to the steel cords of the carcass layer is set in a range from 1° to 12°, and
wherein a crossing angle of the organic fiber cords of the second shape retaining layer relative to the steel cords of the carcass layer is set in a range from 30° to 70°.

* * * * *